United States Patent
Miyamoto et al.

(10) Patent No.: US 9,821,228 B2
(45) Date of Patent: *Nov. 21, 2017

(54) VIDEO GAME SYSTEMS AND METHODS

(71) Applicant: Nintendo Co., Ltd., Kyoto (JP)

(72) Inventors: Shigeru Miyamoto, Kyoto (JP);
Hiroyuki Kimura, Kyoto (JP);
Shigeyuki Asuke, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,856

(22) Filed: Aug. 11, 2016

(65) Prior Publication Data

US 2016/0346692 A1 Dec. 1, 2016

Related U.S. Application Data

(63) Continuation of application No. 14/172,674, filed on Feb. 4, 2014, now Pat. No. 9,446,312, which is a
(Continued)

(51) Int. Cl.
*A63F 13/56* (2014.01)
*A63F 13/20* (2014.01)
(Continued)

(52) U.S. Cl.
CPC .............. *A63F 13/56* (2014.09); *A63F 13/10* (2013.01); *A63F 13/20* (2014.09); *A63F 13/21* (2014.09); *A63F 13/235* (2014.09); *A63F 13/25* (2014.09); *A63F 13/327* (2014.09); *A63F 13/45* (2014.09); *A63F 13/58* (2014.09); *A63F 13/822* (2014.09); *A63F 13/843* (2014.09); *A63F 2300/65* (2013.01); *A63F 2300/8088* (2013.01)

(58) Field of Classification Search
CPC ........ A63F 13/20; A63F 13/45; A63F 13/422; A63F 13/58; A63F 13/85; A63F 2300/65
See application file for complete search history.

(56) References Cited

U.S. PATENT DOCUMENTS 8,282,454 B2   10/2012   Miyamoto et al.
8,678,891 B2    3/2014   Miyamoto et al.
(Continued)

OTHER PUBLICATIONS

Miyamoto et al., U.S. Appl. No. 14/172,674, filed Feb. 4, 2014, now U.S.Pat. No. 9,446,312.
(Continued)

*Primary Examiner* — Dmitry Suhol
*Assistant Examiner* — David Duffy
(74) *Attorney, Agent, or Firm* — Nixon & Vanderhye, P.C.

(57) ABSTRACT

Example systems and methods relate to playing a multi-player video game in which multiple players each supply inputs to a respective input device to control a corresponding game character in a game world displayed on a display screen. Movements of each game character in the game world are controlled in accordance with respective first game character control operations during the playing of the multi-player video game. In response to satisfaction of one or more conditions, one player's game character is protected from harm in the game world, wherein one of the one or more conditions is a condition triggered voluntarily by the one player. Movements of the protected game character in the game world are controlled based on a position of another, unprotected game character.

18 Claims, 8 Drawing Sheets

Related U.S. Application Data continuation of application No. 13/610,066, filed on Sep. 11, 2012, now Pat. No. 8,678,891, which is a continuation of application No. 12/893,861, filed on Sep. 29, 2010, now Pat. No. 8,282,454.

(51) Int. Cl.
    *A63F 13/45*     (2014.01)
    *A63F 13/58*     (2014.01)
    *A63F 13/843*     (2014.01)
    *A63F 13/822*     (2014.01)
    *A63F 13/40*     (2014.01)
    *A63F 13/21*     (2014.01)
    *A63F 13/235*     (2014.01)
    *A63F 13/25*     (2014.01)
    *A63F 13/327*     (2014.01)

(56) References Cited

U.S. PATENT DOCUMENTS

| | | |
|---|---|---|
| 8,690,653 B2 | 4/2014 | Miyamoto et al. |
| 9,254,439 B2 | 2/2016 | Miyamoto et al. |
| 9,254,440 B2 | 2/2016 | Miyamoto et al. |
| 9,259,649 B2 | 2/2016 | Miyamoto et al. |
| 9,446,312 B2 | 9/2016 | Miyamoto et al. |
| 2006/0094502 A1 | 5/2006 | Katayama et al. |
| 2010/0261526 A1 | 10/2010 | Anderson et al. |
| 2013/0005462 A1 | 1/2013 | Miyamoto et al. |
| 2013/0005468 A1 | 1/2013 | Miyamoto et al. |
| 2013/0005485 A1 | 1/2013 | Miyamoto et al. |

OTHER PUBLICATIONS

"Tibia-Free Multiplayer Online Role Playing Game—Game Guide," Jan. 1997.

Shellra, Final Fantasy Wiki, (Final Fantasy XI, released in May 2002).

Protect, Final Fantasy Wiki, (Final Fantasy X-2, released in 2003).

D&D Wiki, Shield (3.5e Creative Ability), 2009.

McLaughlin, Jim, "New Super Mario Bros Wii PAX Hands-On Preview [online]." Sep. 10, 2009 at 6:25 p.m. [retrieved Sep. 3, 2014]. Retrieved from the Internet: <URL: http://www.co-optimus.com/article/2579/new-super-mario-bros-wii-pax-hands-on-preview.html>.

Miyamoto et al., U.S. Appl. No. 12/893,861, filed Sep. 29, 2010—now U.S. Pat. No. 8,282,454.

Miyamoto et al., U.S. Appl. No. 13/610,023, filed Sept 11, 2012—now U.S. Pat. No. 9,254,439.

Miyamoto et al., U.S. Appl. No. 13/610,066, filed Sept 11, 2012—now U.S. Pat. No. 8,678,891.

Miyamoto et al., U.S. Appl. No. 13/610,085, filed Sept 11, 2012—now U.S. Pat. No. 8,690,653.

Miyamoto et al., U.S. Appl. No. 14/172,586, filed Feb. 4, 2014—now U.S. Pat. No. 9,254,440.

Miyamoto et al., U.S. Appl. No. 14/172,629, filed Feb. 4, 2014—now U.S. Pat. No. 9,259,649.

Miyamoto et al., U.S. Appl. No. 14/172,674, filed Feb. 4, 2014—allowed.

NON-LIMITING
EXAMPLE GAME SYSTEM

NON-LIMITING EXAMPLE CONTROLLER

VIDEO GAME SYSTEMS AND METHODS

CROSS-REFERENCE TO RELATED APPLICATION

This application is a continuation of application Ser. No. 14/172,674, filed Feb. 4, 2014, now U.S. Pat. No. 9,446,312, which is a continuation of application Ser. No. 13/610,066, filed Sep. 11, 2012, now U.S. Pat. No. 8,678,891, which is a continuation of application Ser. No. 12/893,861, filed Sep. 29, 2010, now U.S. Pat. No. 8,282,454. The contents of each of these applications are incorporated herein in their entirety.

BACKGROUND

In a typical video game, a player uses an input device to control actions and movement of a game character in a virtual game world. Games often include obstacles and challenges for the game character to overcome and the game may have multiple levels in which the obstacles and challenges become more difficult so that greater player skill is required.

When a player fails to overcome some obstacle or challenge, the game character may, for example, lose "vitality" or be returned to the beginning of a particular level. Generally, if the player fails a certain number of times or vitality becomes zero, game play ends for that player.

Games can be enjoyed by players having different skill levels. However, players of different skill levels can find it difficult to play a multi-player game together because player(s) having greater skill ("power player(s)") will relatively quickly proceed to game levels which are too complicated or difficult for those having lesser skill. This reduces enjoyment for the lesser-skilled player(s). On the other hand, the better player(s) are likely to become bored if the game remains at a level at which the lesser skilled players can play.

At the E3 convention in June 2009, a multi-player Super Mario Bros. game demo encased a game character in a protective bubble when the character lost a life. The character remained encased in the bubble until freed by another player. While in the bubble, the character could not be harmed, but also could not participate in game play. Thus, instead of the player being eliminated from further game play upon losing a life, the player was penalized, but was able to play on, albeit with reduced capabilities (e.g., very limited control of game character movements and actions) for at least some period time.

DETAILED DESCRIPTION OF EXAMPLE EMBODIMENTS

This application describes example systems and methods that relate to playing a multi-player video game in which multiple players each supply inputs to a respective input device to control a corresponding game character in a scrolling-type game world displayed on a display screen. The video game may be played using a video game console, a hand-held gaming device, a personal digital assistant, a cellular phone, a pad-type computer, a notebook computer, a personal computer and the like. Each player controls a game character in response to inputs supplied to the respective input device. The input device may include one or more of buttons, keys, sliders, joysticks, cross-switches and the like and may also sense motion or position change through the use of one or more of cameras, accelerometers, gyro sensors, ultrasonic transducers, magnetometers and the like.

In response to a first predetermined input (e.g., a button press) from one of the players, that player's game character is protected from harm in the game world. This protected state may be shown by, for example, wrapping or encasing the game character in a bubble. The protected game character moves based on the scrolling/non-scrolling state of the game world determined in accordance with movement of one or more unprotected game characters. For example, if the game world is not scrolling, the protected game character may move generally toward the center of the currently displayed game world. If the game world is scrolling, the protected game character may move generally in the same direction as the game world background.

The protecting of the game character is stopped in response to one or more protecting stopping conditions, whereby the game character is again fully controllable by the one player in response to inputs to the respective input device. By way of example, the protecting may be stopped when the protected game character contacts another, unprotected game character. By way of further example, the protecting may be stopped when the protected game character is hit by a projectile (e.g., a fireball, a shell, etc.), such as a projectile flung by another game character.

By allowing a player to voluntarily invoke the protection feature, the player's character can be protected during difficult parts of the game as determined by the player's own judgment and can follow along with the progress of a better player(s). This can make the playing of multi-player games among players of differing abilities more enjoyable.

Figure 1:
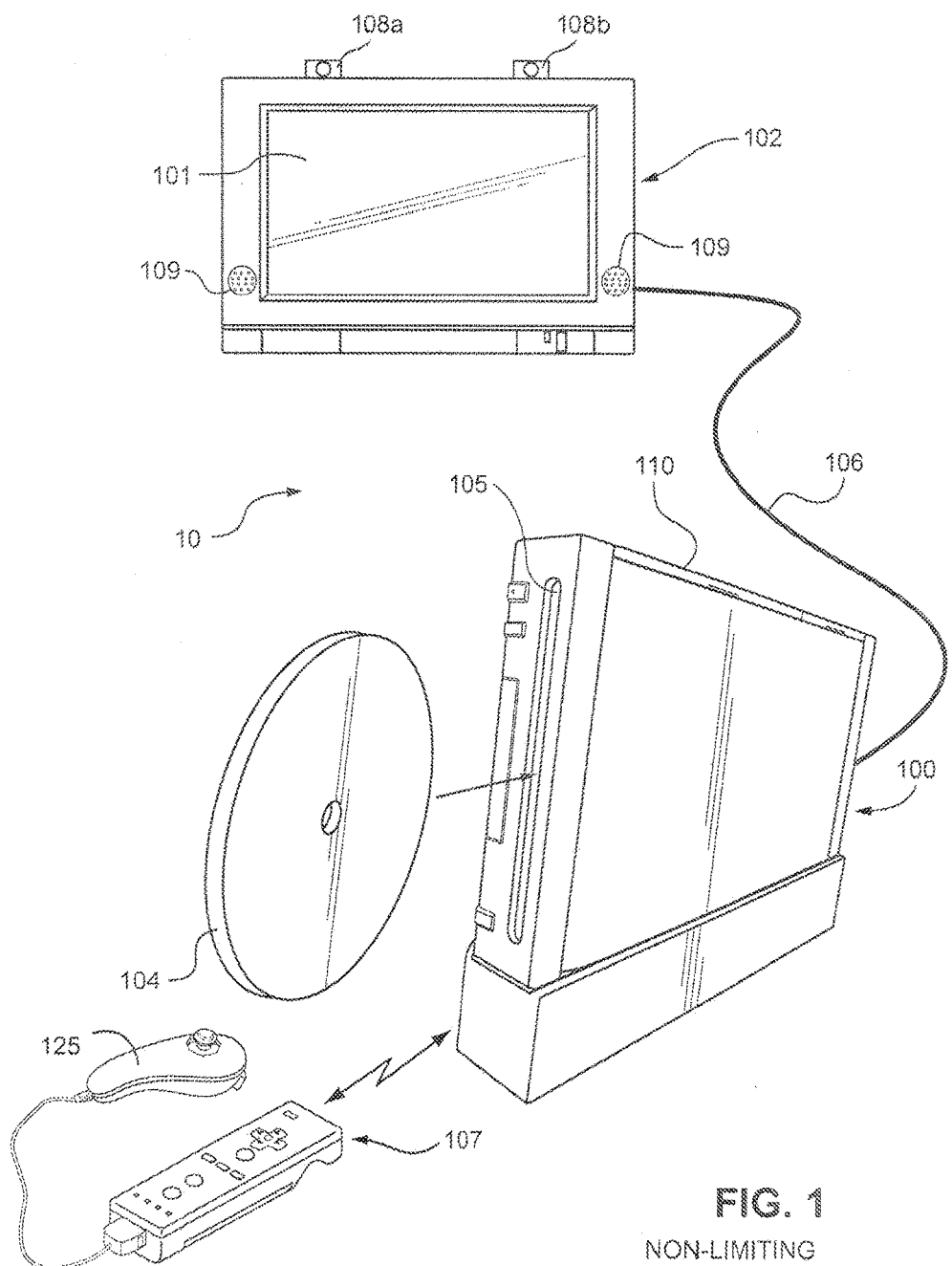
FIG. 1 shows an example game system in which the systems and methods described herein can be used.

FIG. 1 shows a non-limiting example game system 10 in which the video game systems and methods described herein may be used. As shown in FIG. 1, example game system 10 includes a game console 100, a television 102 and a controller 107. While FIG. 1 shows a video game console, the systems and methods described herein are in no way limited to this gaming environment and are also applicable to video games running on hand-held gaming devices, personal digital assistants, cellular telephones, pad-type computers, notebook computers, personal computers and the like.

Game console 100 executes a game program(s) or other software application(s) stored on optical disc 104, which is inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored in whole or part on other removable or non-removable, non-transitory storage media such as semiconductor memories, magneto-optical memories, magnetic memories and the like.

Controller 107 is held in a player's hand and wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) or WiFi may be used for the wireless transmissions between controller 107 and game console 100.

A "nunchuk" controller 125 may be connected to controller 107. Although a wired connection is shown in FIG. 1 between controller 107 and nunchuk controller 125, alternatively, a wireless connection may be used. Nunchuk controller 125 may be held in the user's "other" hand (i.e., the hand not holding controller 107) and provides additional game control data to video game console 100.

Controller 107 also includes an imaging information calculation section (not shown) for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. Additional details of the imaging operation may be found in U.S. Patent Publication No. 2007-0066394 A1; U.S. Patent Publication No. 2007-0072674 A1; and U.S. Patent Publication No. 2007-0060228 A1. The entire contents of each of these applications are expressly incorporated herein.

Controller 107 also preferably includes an accelerometer(s) and/or a gyro sensor(s). For example, controller 107 may include a three-axis, linear accelerometer that detects linear acceleration in three directions, e.g., the up/down direction, the left/right direction, and the forward/backward direction. Linear accelerometers are only capable of detecting acceleration along a straight line corresponding to each axis thereof. In other words, the direct output of the accelerometer is limited to signals indicative of linear acceleration (static or dynamic) along each of the axes thereof. As a result, the accelerometer cannot directly detect movement along a non-linear (e.g. arcuate) path, rotation, rotational movement, angular displacement, tilt, position, attitude or any other physical characteristic. However, through additional processing of the linear acceleration signals output from the accelerometer, additional information relating to controller 107 can be inferred or calculated (determined). For example, by detecting static, linear acceleration (i.e., gravity), the linear acceleration output of the accelerometer can be used to determine tilt of the controller relative to the gravity vector by correlating tilt angles with detected linear acceleration. In this way, the accelerometer can be used in combination with a micro-computer (not shown) of controller 107 (or another processor such as a processor of the video game console 100) to determine tilt, attitude or position of controller 107. Similarly, various movements and/or positions of controller 107 can be calculated through processing of the linear acceleration signals generated by the accelerometer when controller 107 is subjected to dynamic accelerations by, for example, a user shaking or waving the controller.

Gyro sensors can be used in addition to, or in place of, the acceleration sensor for determining, for example, movement, tilt, etc. of the controller.

Figure 2:
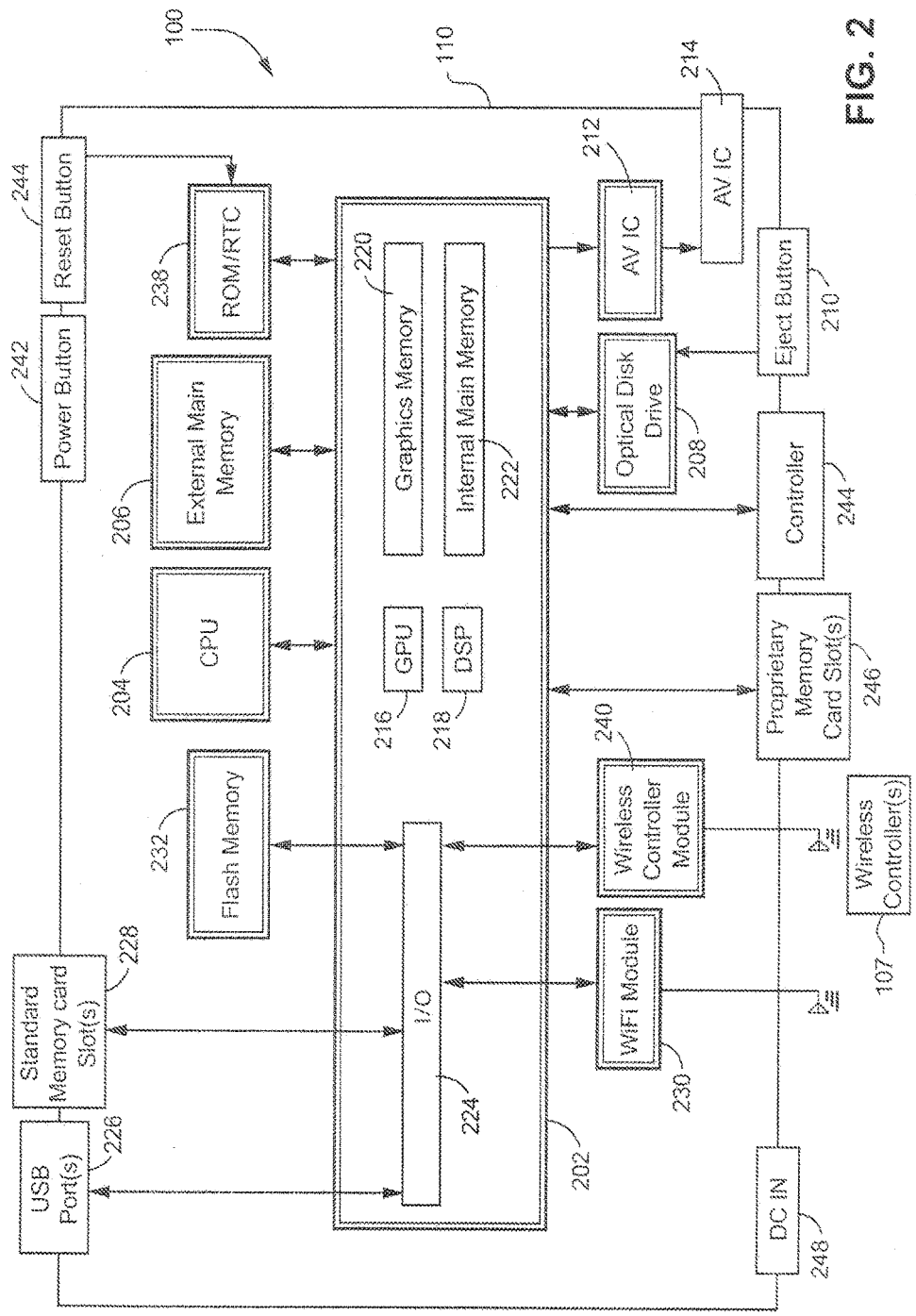
FIG. 2 is a detailed block diagram showing components of example game console 100 of FIG. 1.

With reference to the block diagram of FIG. 2, game console 100 includes a RISC central processing unit (CPU) 204 for executing various types of software applications including (but not limited to) video game programs. CPU 204 executes a boot program stored, for example, in a boot ROM to initialize game console 100. CPU 204 can also execute a software application (or applications) stored on optical disc 104, which is inserted in optical disk drive 208, or in some other memory accessible to CPU 204. User-accessible eject button 210 provided on housing 110 of game console 100 may be used to eject an optical disk from disk drive 208.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, speakers, microphones, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like. Content such as photos and music contained on memory cards inserted into slot 228 may be accessed via the user interface of the console for output, for example, using the display screen 101 and speakers 109 of television 102.

WiFi module 230 enables game console 100 to be connected to a wireless access point. The access point may provide internet connectivity for on-line gaming with players at other locations (with or without voice chat capabilities), as well as web browsing, e-mail, software downloads (including downloads of game software and other applications) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications (e.g., 802.11, 802.11a, 802.11b, 802.11g, 802.11n, etc.). However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself (e.g., button press data, accelerometer data, gyroscope data, etc.) as well as signals generated by other devices such as nunchuk controller 125 that may be connected to controller 107. Of course, in other implementations, nunchuk controller 125 may directly communicate signals (by wire or wirelessly) to wireless controller module 240 of console 100. As mentioned above, the communications may use the Bluetooth protocol.

Wireless controller module 240 may also wirelessly transmit signals to controller 107. By way of example without limitation, controller 107 (and/or another game controller such as nunchuk controller 125 connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240. It will be appreciated that wireless controller module 240 can communicate signals to nunchuk 125 either directly or via controller 107.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program or other software application, applet, script, etc. read from optical disc 104 by the CPU 204, a game program or other application, applet, script, etc. read from flash memory 232 by CPU 204, various types of data and the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 4:
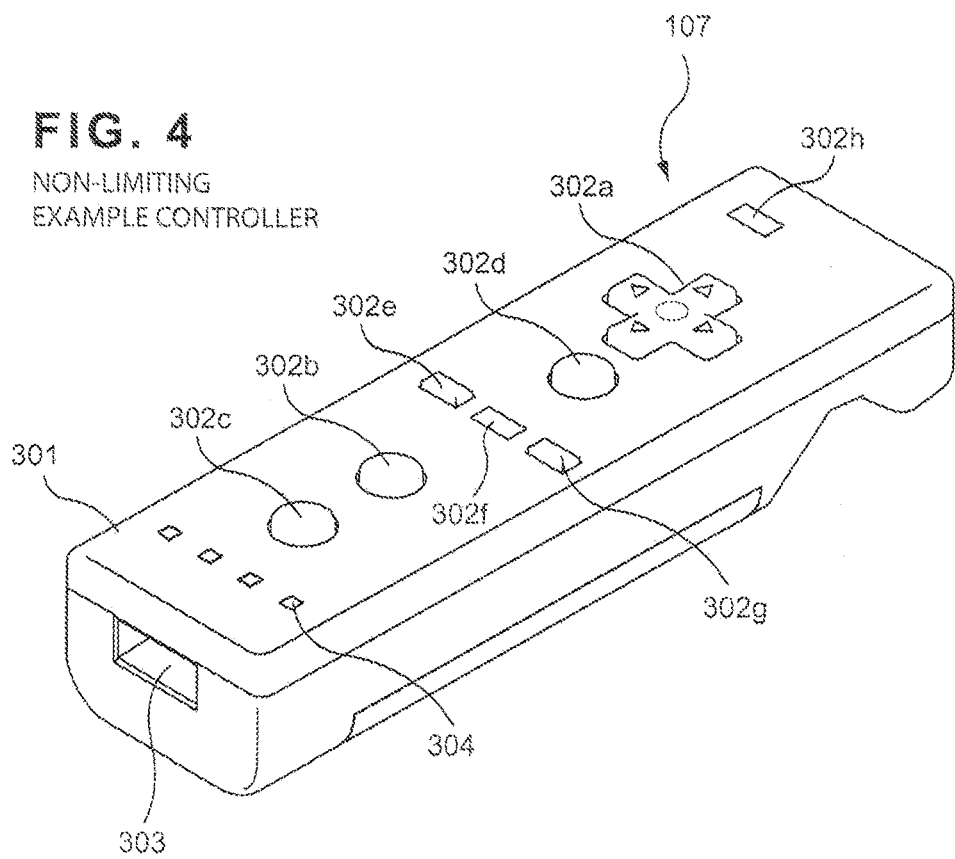
FIG. 4 shows a more detailed view of an operation section of example controller 107.

With reference to FIG. 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. By actuating cross-switch 302a, the player can, for example, move a character in different directions in a virtual game world.

Buttons (or keys) 302b through 302g are provided rearward of cross-switch 302a on the top surface of housing 301. Buttons 302b through 302g are operation devices that output respective signals when a player presses them. Generally, buttons 302b through 302g are assigned various functions in accordance with the application being executed by game console 100. Button 302h is a power switch for remote on-off switching of the power to game console 100.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number.

An example multi-player video game will now be described. The particular details of the example video game are provided by way of illustration and not limitation. The example video game uses side scrolling and vertical scrolling in which the screen scrolls forward and backward and up and down based on the movement direction and speed of the game characters. Of course, the systems and methods described herein are not limited to such games.

Program instructions for the video game may be encoded onto an optical disk 104 (i.e., a non-transitory computer readable medium), which is inserted in optical disk drive 208 of game console 100. Alternatively, the program instructions may be downloaded to game console 100 (e.g., via a connection to the internet) and stored in on-board memory, such as flash memory 232. In either case, these program instructions are executed by CPU 204, and GPU 216 performs image processing based on instructions from CPU 204. Images resulting from the image processing are displayed on television 102. Audio DSP 218 performs audio processing for the game based on instructions from CPU 204. Audio resulting from the audio processing is output via speakers 109 of television 102.

The example video game selectively protects game characters by wrapping or surrounding them with a "bubble." While a player's character is encased or enclosed in a bubble, the character cannot be freely manipulated by the player. For example, the player has limited movement control of the bubble-encased character and the player cannot control the bubble-encased character to perform actions such as weapon use, jumping and the like. In addition, the bubble-encased character is not affected by geographical objects in the game. For example, such a character may penetrate into and pass through surfaces such as the ground or walls.

Figure 3:
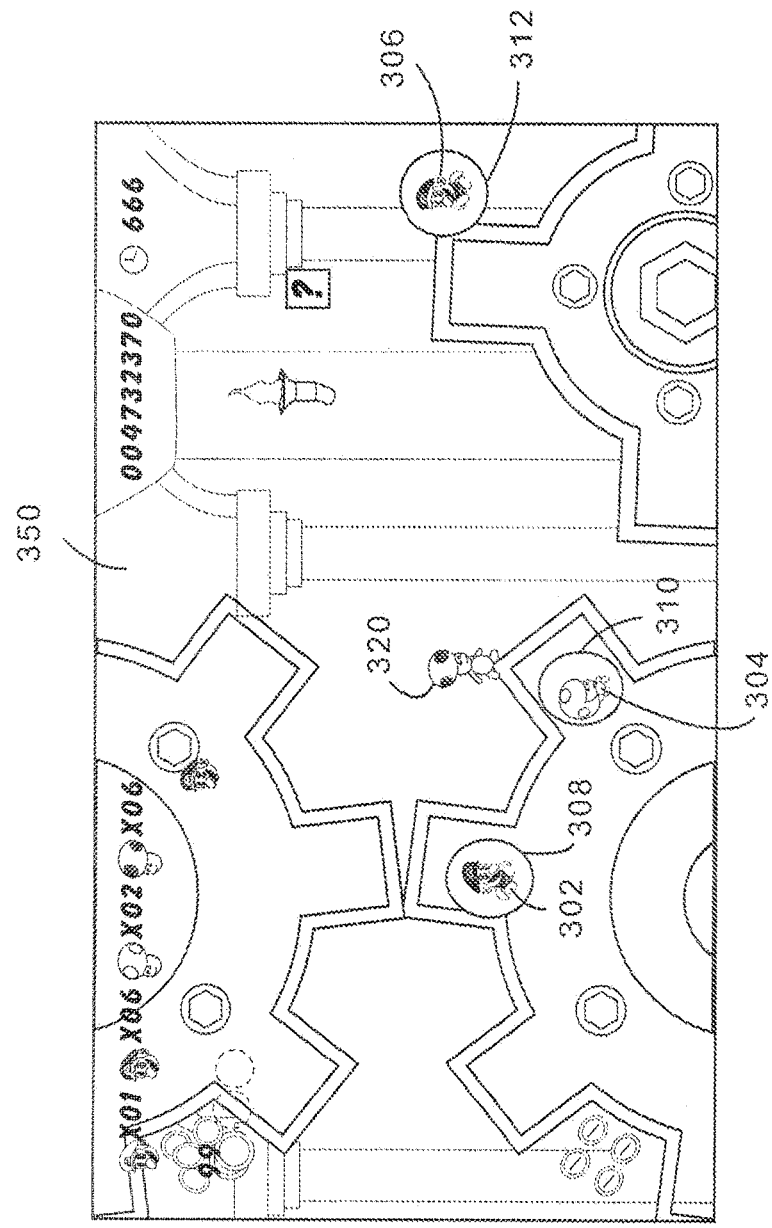
FIG. 3 shows an example screen which includes game characters encased in respective transparent bubbles within a game world.

FIG. 3 shows an example screen which includes game characters 302, 304 and 306 encased in respective, transparent (or substantially transparent) bubbles 308, 310 and 312 within a game world 350. Game character 320 is not encased in a bubble. In the FIG. 3 example, bubbles 308, 310 and 312 are spherical bubbles that surround or wrap around game characters 302, 304 and 306. Other bubble shapes (e.g., cubes, ellipsoids, etc.) may be used. In addition or alternatively, other techniques may be used to indicate that a particular character is protected from harm in the game world (e.g., different color(s), highlighting, blinking, change in size and the like). A shield or a force field may also be used to show that a game character is in an invulnerable state.

A bubble-encased character is protected from or invulnerable to the effects of game objects (e.g., enemy characters or enemy attack objects) that might otherwise cause the game character to lose its life or to lose vitality.

The above-described behavior continues until the bubble is "burst" or "popped" (e.g., by contacting or touching another player's character or by being contacted or hit with a projectile such as a fireball or shell) from another player's character.

There are two ways for a game character to enter a bubble state in the example video game.

First, a player's character is automatically placed in a bubble by the game program when a player makes a mistake or error (or some number of mistakes or errors) or suffers some loss of vitality that would ordinarily cause game play to end for that player. Thus, for example, if a received blow or strike from a weapon or projectile would ordinarily cause a character to lose its life and end game play for that character, the character is instead encased in a bubble.

Second, a player's character may be encased in bubble by the game program when the player provides a predetermined input to controller 107. By way of example and without limitation, the predetermined button may be button 302d on controller 107 shown in FIG. 4. Of course, other buttons, keys or actions may be used to cause a player's character to be placed in a bubble.

Thus, a character may enter a bubble involuntarily (when a player makes a mistake or error) or voluntarily (when the player provides a predetermined input). Because an encased, "in-bubble" character is in an invulnerable state, a player of lesser skill can voluntarily put his/her character in a bubble and "follow along" with a player of greater skill without being vulnerable to attack or vitality-reducing game world objects. Thus, a lesser skilled player can voluntarily place his/her game character in a protective bubble and allow a more skilled player to navigate through a difficult area of the game world, until the lesser skilled player's character arrives at a "safer" place. This makes the multi-player game more enjoyable for both greater- and lesser-skilled players.

In the example video game, at least one game character must not be in a bubble in order for the video game to proceed. Thus, if all players except one are in bubbles and the remaining player makes a mistake or error, the game program causes game play to end. In addition, if all players except one are in bubbles and the remaining player presses button 302d to voluntarily enter a bubble, the game program causes game play to end.

If a player's character is wrapped in a bubble because of error or mistake or loss of vitality, the in-bubble character appears after a short lapse of time at a position displaced from the location of the error or mistake in the game progress (scrolling) direction. Thus, if the game is side-scrolling in a forward direction, the in-bubble character is displaced in the forward direction relative to the position at which the mistake or error occurred. This disappearance for a short period of time constitutes a penalty for the player and also signals to other players that an error or mistake was made. If a player presses button 302d to enter a bubble, the in-bubble character appears immediately at the location of the character at the time the button was pressed.

If the game is transitioning from one level or area to another (e.g., via a door or portal) when the player's character enters a bubble either because of mistake or because of a button press, the bubble appears in new level or area.

Figure 5A:
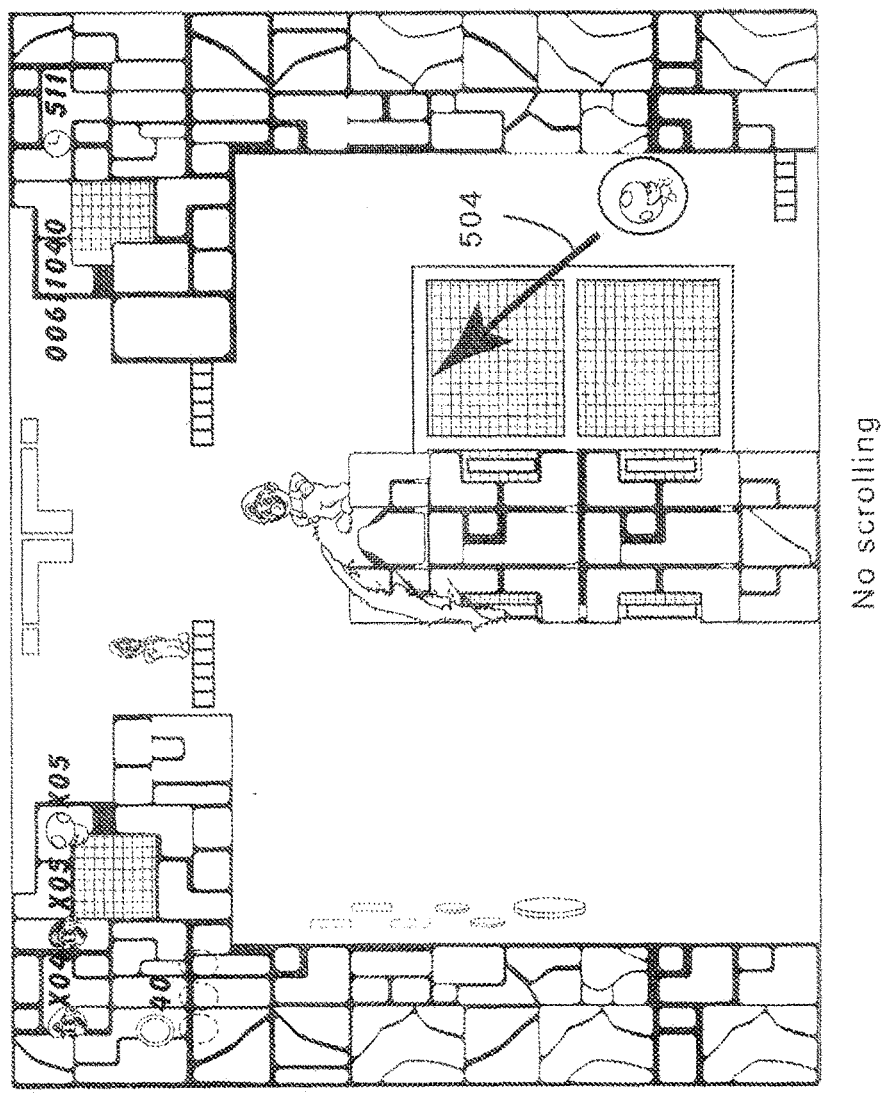
FIGS. 5A-5C illustrate movement of an in-bubble game character.

When a player's character enters a bubble, the in-bubble character generally moves or floats toward the center of the screen if the screen is not scrolling. FIG. 5A shows a non-scrolling screen and character 502 generally moves in the direction of arrow 504 toward the center of the screen. It is of course not necessary that the movement of the in-bubble character be toward the exact geometric screen center—the movement could simply be toward the vicinity of the screen center.

Figure 5B:
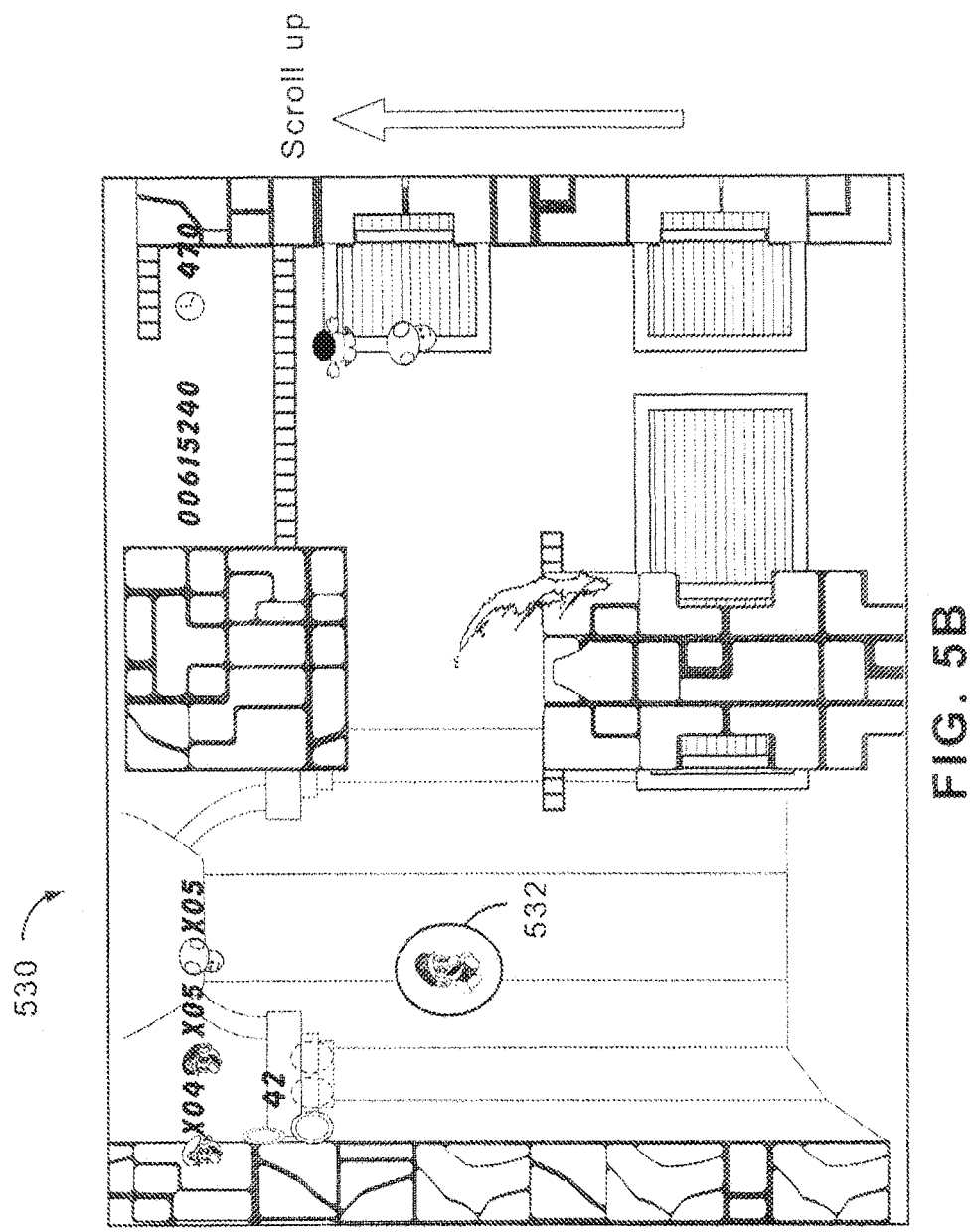
Figure 5C:
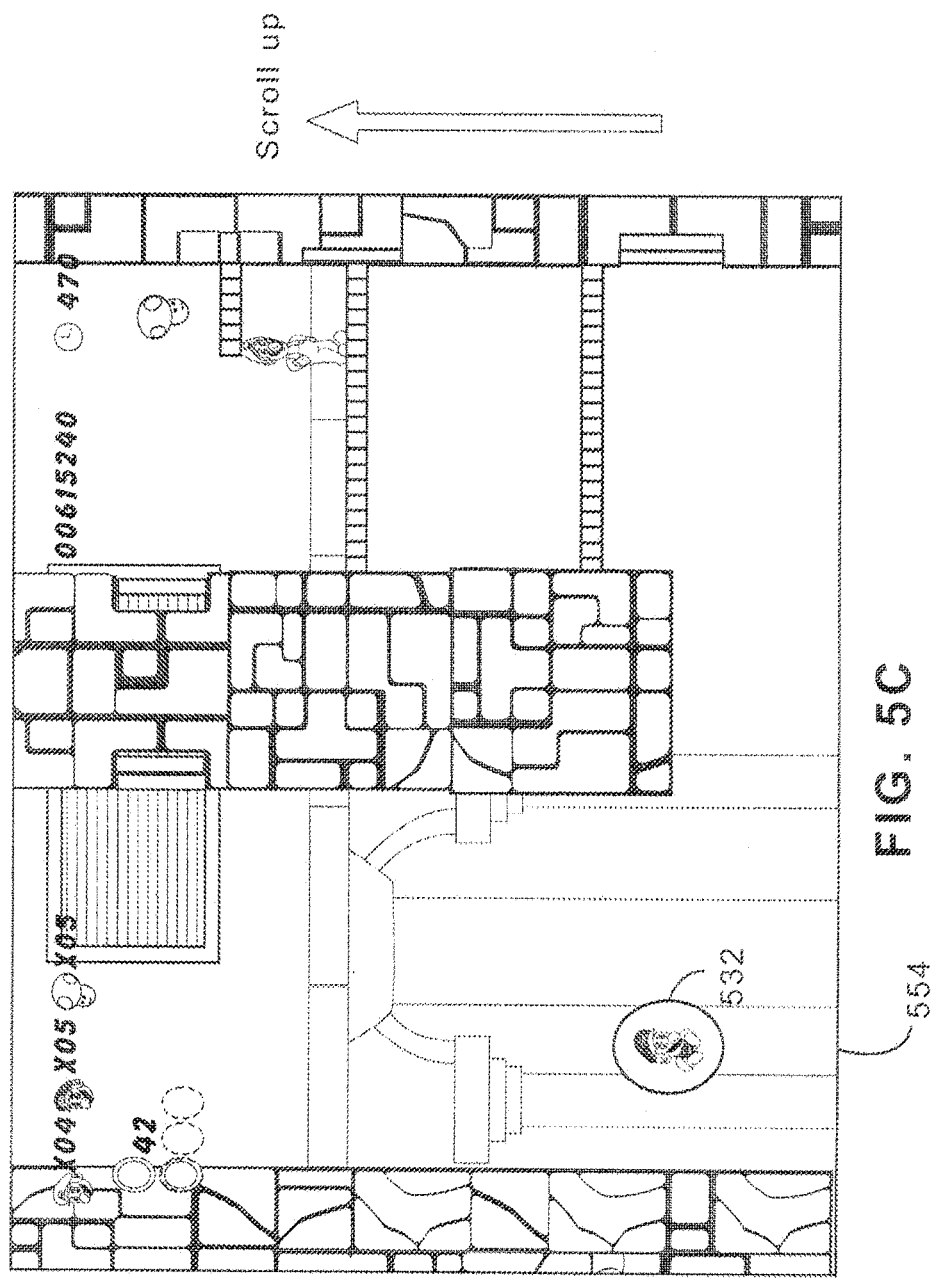

When the screen is scrolling, the in-bubble character moves or floats in the same direction as the background. With reference to FIGS. 5B and 5C, the screen 530 is scrolling up and thus the background and in-bubble character 532 moves in a downward direction as can be seen by comparing these two figures.

The moving in-bubble character acquires "inertia" so that a moving in-bubble character may continue to move even if, for example, the scrolling of the screen stops. Thus, referring to FIG. 5C, if the screen scrolling was to stop, the in-bubble character 532 would continue to move downward until it reached the edge 554 of the screen and then it would bounce off the screen edge 554 in a generally upward direction.

Figure 6:
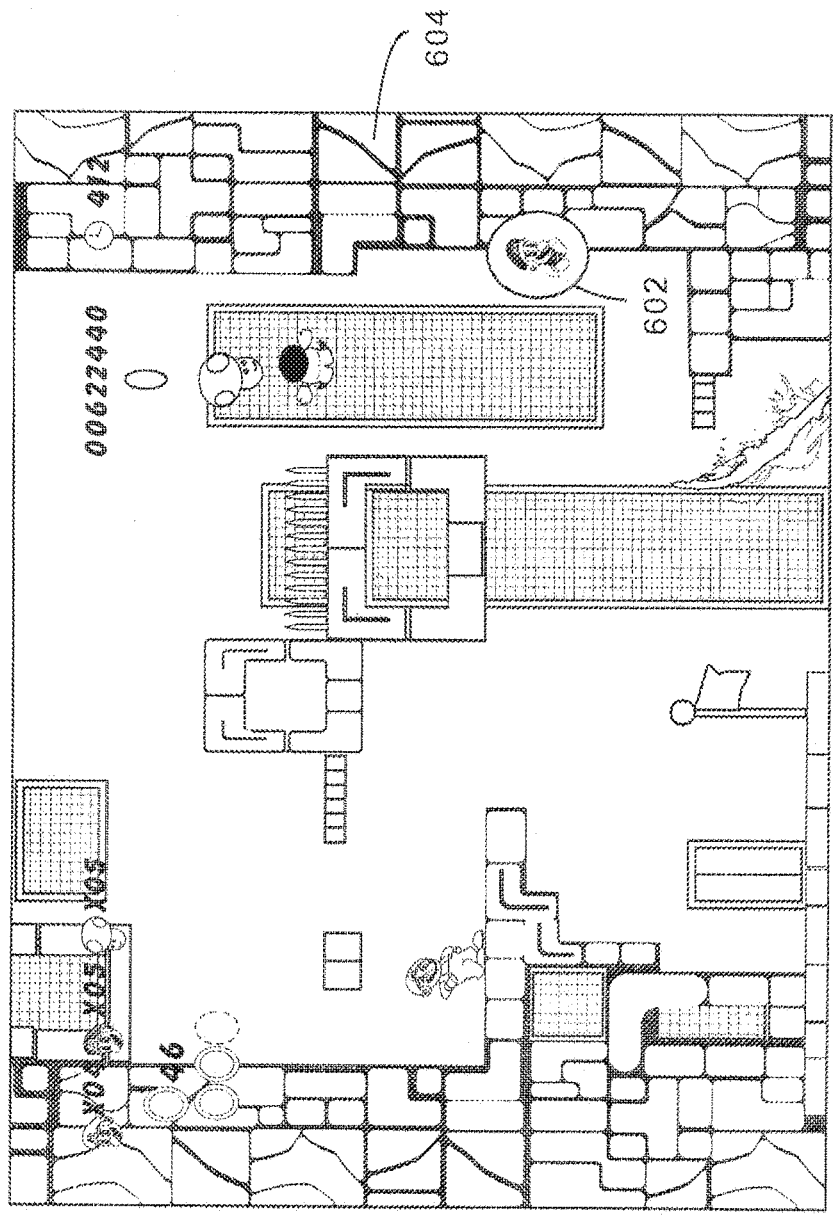
FIG. 6 shows an in-bubble game character penetrating a surface feature.

The in-bubble character may penetrate at least partly into geographic surfaces such as the ground or walls. As shown in FIG. 6, in-bubble character 602 has partially penetrated into wall 604. The game program may be configured so that a certain amount of surface penetration occurs before the in-bubble character bounces off the surface or so that the in-bubble character penetrates or passes through the surface until a screen boundary is reached. Which of these configurations is used may be dependent, for example, upon the location of the geographic surface. For example, if the surface is a wall along the side of the screen, the in-bubble character may penetrate the wall a certain amount before bouncing away. If the surface is a ledge in the middle of the screen, the in-bubble character may pass through the ledge and continue movement until it collides with a screen edge or a wall along the side of the screen. If desired, the inertia of the in-bubble character may be reduced based on the amount of surface penetration. Thus, movement of an in-bubble character may be slowed down when it passes through or penetrates an object.

The player whose character is in a bubble has only limited control of the in-bubble character's motion. In particular, the movement control is limited to causing the in-bubble character to move in the direction of a character not in a bubble in response to a predetermined input using controller 107. As explained below, if the in-bubble character contacts a character that is not in a bubble, the bubble pops or bursts. To effect this movement control in the example video game, the player waves controller 107. The game program may be configured to require that the waving is in the form of a particular gesture (e.g., a sideways swipe) or any gesture sufficient to generate an acceleration that exceeds some threshold value. The accelerometer in controller 107 senses acceleration resulting from the waving and acceleration signals resulting from the sensed acceleration are supplied from controller 107 to console 102. In response, the game program causes the bubble to begin to move at a fixed speed toward the closest character not wrapped in a bubble. In addition, the game program controls console 102 to send a signal to the waved controller so that a sound is emitted from that controller.

A bubble pops or bursts under two conditions. First, a bubble pops if it is directly contacted by another player's character that is not in a bubble. Second, a fireball or object can be flung by a character to burst a bubble. The following discussion describes the position at which a bubble bursts if either of the above conditions is met.

In a case in which an in-bubble character contacts a character that is not in a bubble, a collision check is performed between the in-bubble character, geographical feature objects on the screen and game characters other than the character contacted to pop the bubble. As noted above, in-bubble characters can at least partly penetrate geographical feature objects and the above-mentioned collision check is made so that the bubble does not burst while the in-bubble character penetrates a surface. There are various ways to perform such a collision check. For example, the collision check can be performed using a square box that surrounds the in-bubble character and determining whether this bounding box overlaps with (i.e., is colliding with) a surface of a geographical object and/or a game character other than the character causing the bubble to pop.

If the result of the collision check is negative (i.e., the in-bubble character is not penetrating the surface of a geographical feature object and is not in contact with a game character other than the character causing the bubble to burst), the bubble bursts immediately and the player's character can resume normal participation in the game.

If the result of the collision checks determines that the in-bubble character is penetrated within a surface, the game program moves the bubble in the direction of the character that touched it. The collision check is then repeated until the collision check is negative, at which time the bubble is burst and the player's character can resume normal participation in the game.

If the result of the collision check determines that the in-bubble character is contacting a game character other than the character causing the bubble to pop, the game program causes the bubble to pass through this other character before popping.

In a case in which the in-bubble character is contacted by a projectile (e.g., fireball or shell) flung from a character not in a bubble, a similar collision check is performed. If the result of the collision check is negative, the bubble bursts and the player's character resumes normal participation in the game. If the result of the collision check determines that the in-bubble character is penetrated into a surface, the bubble is not burst.

As described above, in the example video game described herein, a player of lesser skill can voluntarily put his/her character in a bubble and "follow along" with a player of greater skill without being vulnerable to attack or vitality-reducing game world objects. Thus, a lesser skilled player can allow a more skilled player to navigate through a difficult area of the game world until the lesser skilled player's character arrives at a "safer" place. This makes the multi-player game more enjoyable for both greater- and lesser-skilled players.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in the specification (e.g., CPU 104) is "programmed" to control the game process in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

While the systems and methods have been described in connection various embodiments, it is to be understood that the system and method are not to be limited to the disclosed embodiment, but on the contrary, are intended to cover various modifications and equivalent arrangements.

We claim:

1. A method for playing a video game, the method comprising:
   generating, in accordance with execution of a video game program by a computer, a virtual game world including a player-controllable game character;
   generating, by the computer, images of the virtual game world for display on a display screen;
   receiving, by the computer, during playing of the video game, a game character movement control signal, the game character movement control signal being based on input to an input device, used by a player, for controlling the game character in the virtual game world;

controlling, by the computer, movements of the game character in the virtual game world in accordance with the game character movement control signal;

based on determining, by the computer, during the playing of the video game, that any one of at least a first condition and a second condition is satisfied, controlling, by the computer, the virtual game world so that the game character becomes a protected game character protected from harm in the virtual game world, wherein the second condition is satisfied by an end of life of the game character; based on determining that the first condition is satisfied, the protected game character appears at a first position in the virtual game world that is substantially the same as a position of the game character in the virtual game world at a time the first condition is satisfied; and, based on determining that the second condition is satisfied, the protected game character appears at a second position in the virtual game world displaced from a position of the game character in the virtual game world at a time the second condition is satisfied;

controlling, by the computer, movements of the protected game character in the virtual game world; and stopping the protecting of the protected game character in response to any one of one or more protecting stopping conditions.

2. The method according to claim 1, wherein the first condition is satisfied without an end of life of the game character.

3. The method according to claim 1, wherein permitted movements of the protected game character in the virtual game world differ from permitted movements of the game character in the virtual game world before the game character becomes the protected game character.

4. The method according to claim 3, wherein the permitted movements of the protected game character are limited relative to the permitted movements of the game character before the game character becomes the protected game character.

5. The method according to claim 3, wherein the permitted movements of the protected game character exclude free control of the movements of the protected game character by the player.

6. The method according to claim 3, wherein the permitted movements of the protected game character are limited to a direction determined based on a virtual game world state when a predetermined input is received by the computer.

7. The method according to claim 6, wherein the predetermined input comprises shaking the input device.

8. The method according to claim 6, wherein the predetermined input comprises a button press.

9. The method according to claim 1, wherein the protected game character is visually distinguished from other unprotected game characters.

10. The method according to claim 9, wherein the protected game character is visually distinguished by an object which surrounds or wraps around the game character.

11. The method according to claim 1, wherein the stopping of protecting is further conditioned on the protected game character not penetrating a geographic surface feature in the virtual game world.

12. The method according to claim 1, wherein the first condition comprises a predetermined input received by the computer.

13. The method according to claim 1, wherein the first condition is based on a predetermined input received by the computer and the second condition is automatically imposed by the video game.

14. The method according to claim 1, wherein:
a game screen is displayed so that the game screen is scrollable; and
when the determining determines that the second condition is satisfied, the second position of the protected game character is based on a direction in which the game screen is scrolled.

15. The method according to claim 1, wherein a first protecting stopping condition comprises contact between the protected game character and a projectile.

16. A video game system comprising:
input devices; and
processing circuitry configured to execute a video game program for a video game in which a player supplies input to an input device to control a game character in a virtual game world displayed on a display screen, the video game program being stored on a non-transitory computer-readable medium and comprising instructions for at least:
generating the virtual game world;
generating images of the virtual game world for display on the display screen;
receiving, during playing of the video game, a game character movement control signal, the game character movement control signal being based on the input to the input device;
controlling movements of the game character in the virtual game world in accordance with the game character movement control signal;
based on determining during the playing of the video game that any one of at least a first condition and a second condition is satisfied, controlling the virtual game world so that the game character becomes a protected game character protected from harm in the virtual game world, wherein
the second condition is satisfied by an end of life of the game character; based on determining that the first condition is satisfied, the protected game character appears at a first position in the virtual game world that is substantially the same as a position of the game character in the virtual game world at a time the first condition is satisfied; and, based on determining that the second condition is satisfied, the protected game character appears at a second position in the virtual game world displaced from a position of the game character in the virtual game world at a time the second condition is satisfied;
controlling movements of the protected game character in the virtual game world; and
stopping the protecting of the protected game character in response to any one of one or more protecting stopping conditions.

17. A non-transitory computer-readable medium having encoded therein program instructions for a video game in which a player supplies input to an input device to control a game character in a virtual game world displayed on a display screen, the instructions, when executed by a computer of a video game apparatus, causing the video game apparatus to perform at least:
generating the virtual game world;
generating images of the virtual game world for display on the display screen;
receiving, during playing of the video game, a game character movement control signal, the game character movement control signal being based on the input to the input device;

controlling movements of the game character in the virtual game world in accordance with the game character movement control signal;
based on determining during the playing of the video game that any one of at least a first condition and a second condition is satisfied, controlling the virtual game world so that the game character becomes a protected game character protected from harm in the virtual game world, wherein
the second condition is satisfied by an end of life of the game character; based on determining that the first condition is satisfied, the protected game character appears at a first position in the virtual game world that is substantially the same as a position of the game character in the virtual game world at a time the first condition is satisfied; and, based on determining that the second condition is satisfied, the protected game character appears at a second position in the virtual game world displaced from a position of the game character in the virtual game world at a time the second condition is satisfied;
controlling movements of the protected game character in the virtual game world; and
stopping the protecting of the protected game character in response to any one of one or more protecting stopping conditions.

18. A video game apparatus for a video game program for a video game in which a player supplies input to an input device to control a game character in a virtual game world displayed on a display screen, the video game apparatus comprising:
processing circuitry including at least one processor, the processing circuitry configured to perform operations comprising:
generating the virtual game world;
generating images of the virtual game world for display on a display screen;
receiving, during playing of the video game, a game character movement control signal, the game character movement control signal being based on the input to the input device;
controlling movements of the game character in the virtual game world in accordance with the game character movement control signal;
based on determining during the playing of the video game that any one of at least a first condition and a second condition is satisfied, controlling the virtual game world so that the game character becomes a protected game character protected from harm in the virtual game world, wherein
the second condition is satisfied by an end of life of the game character; based on determining that the first condition is satisfied, the protected game character appears at a position in the virtual game world that is substantially the same as a first position of the game character in the virtual game world at a time the first condition is satisfied; and, based on determining that the second condition is satisfied, the protected game character appears at a position in the virtual game world displaced from a second position of the game character in the virtual game world at a time the second condition is satisfied;
controlling movements of the protected game character in the virtual game world; and
stopping the protecting of the protected game character in response to any one of one or more protecting stopping conditions.

* * * * *